Patented Sept. 24, 1929

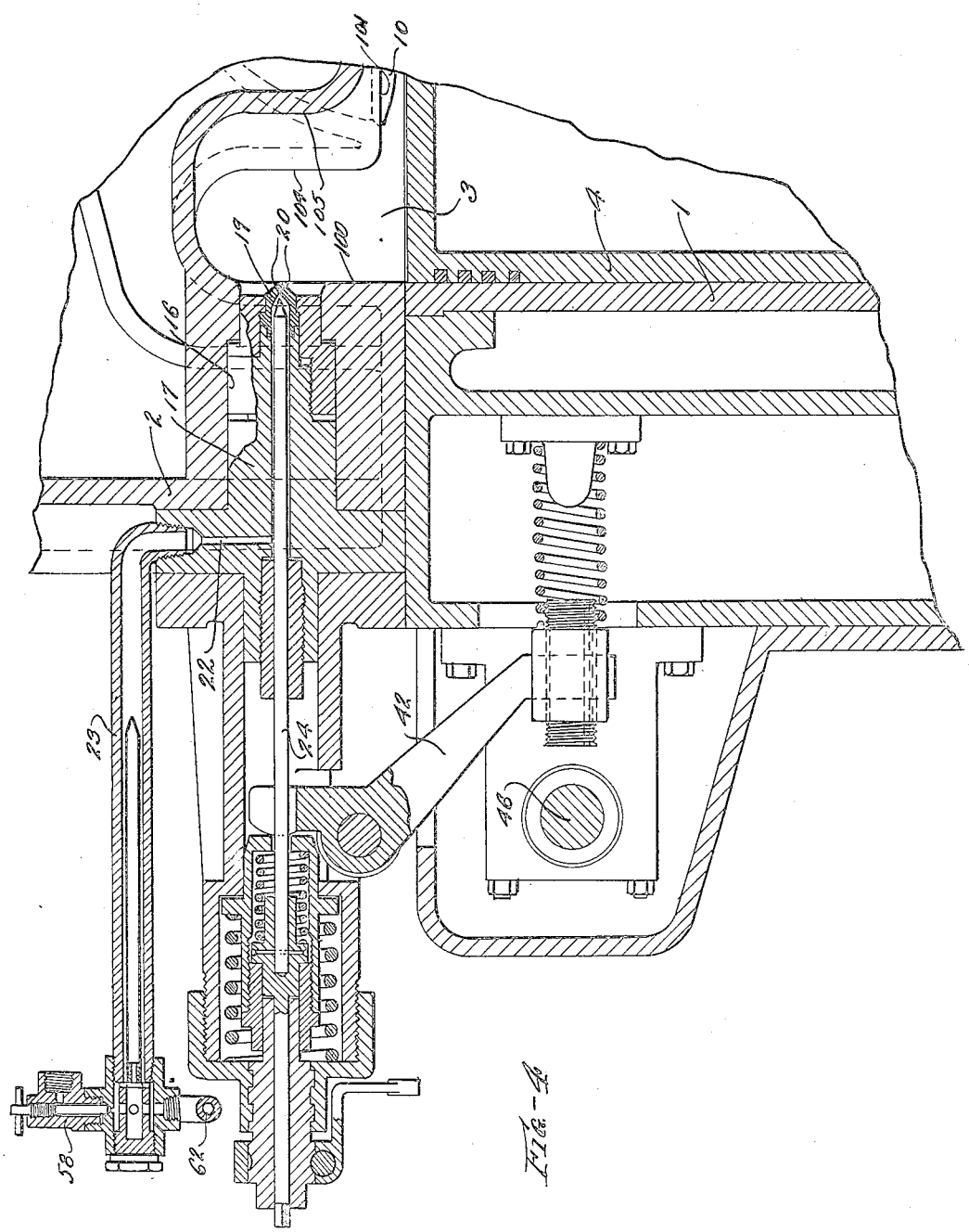

1,729,530

UNITED STATES PATENT OFFICE

ALEXANDER WINTON, OF LAKEWOOD, OHIO

INTERNAL-COMBUSTION ENGINE

Application filed October 8, 1927. Serial No. 224,916.

This invention relates to internal combustion engines, and more specifically to the arrangement of combustion chamber thereof and of the valves controlling the combustion chamber.

Reference is had to what has become a more or less standard type of engine construction in which a piston is arranged for reciprocal movement in a cylinder closed by a head having ports, the head of the piston forming with the cylinder head and the cylinder wall portions therebetween, an expansion chamber; inlet to and exhaust from which, is controlled by valves arranged to control the ports whereby the engine performs a cycle including among its operations charging the expansion chamber with elements of combustion, compressing the contents of the chamber, effecting ignition, expanding the chamber under the high pressure resulting from combustion, and exhausting from the chamber the products of combustion.

Ordinarily the parts which form the expansion chamber are so arranged that the contents are at the time of ignition under high compression in a combustion chamber portion usually formed in the cylinder head. To reduce heat losses to a minimum, it is desirable that the combustion chamber be of as nearly spherical form as possible; to reduce fluid friction losses it is desirable that the ports be as large as possible; and for mechanical reasons it is desirable that the valves, at least those handling a large volume, be arranged in parallel relation.

A still further desirability is that a high state of turbulence be created in the contents of the expansion chamber just before the combustion, this both for the purpose of insuring rapid propagation of combustion and for maintaining the liquid combustible clear of the walls of the combustion chamber.

Briefly it is an object of my invention to satisfy all of the above requirements by an arrangement which does not violate in appreciable degree any of the laws which dictate the requirements.

Further, in an engine arranged to operate on the Otto cycle it is desirable that the ignition spark gap, be located at as near the center of the combustion chamber as possible; this being possible of approach in practice by arranging the walls of the combustion chamber whereby the spark gap will lie substantially at one point therein and be approximately equi-distant from the greater part of the remaining wall area. Also, in engines arranged to operate on the solid fuel injection or Diesel principle it is desirable that the combustion chamber be arranged with respect to the injection nozzle whereby the fuel jet will lose its identity in the contents of the chamber before reaching the opposite wall thereof.

It is therefore another object of my invention to provide a cylinder head which may be employed in an engine of either type mentioned.

Figure 1:
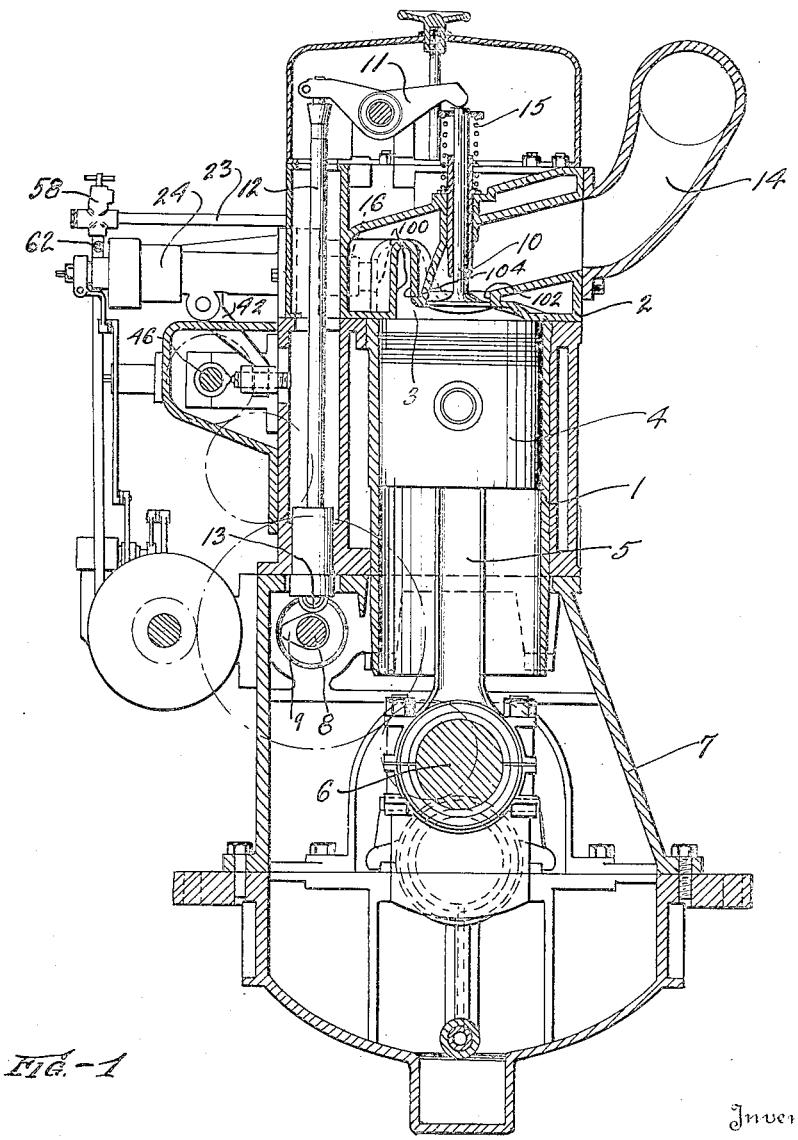
Figure 3:
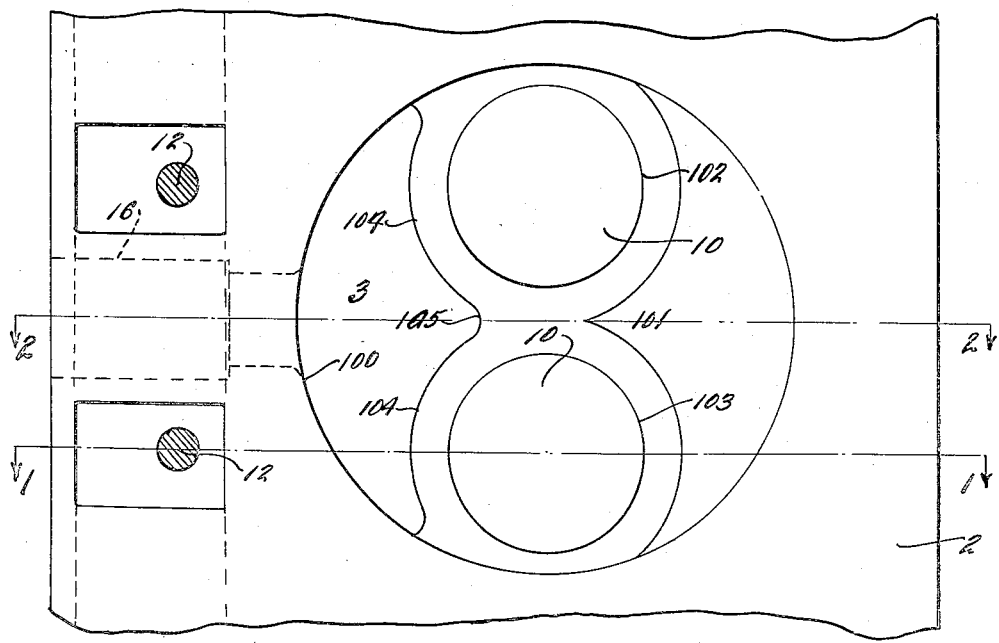
Figure 2:
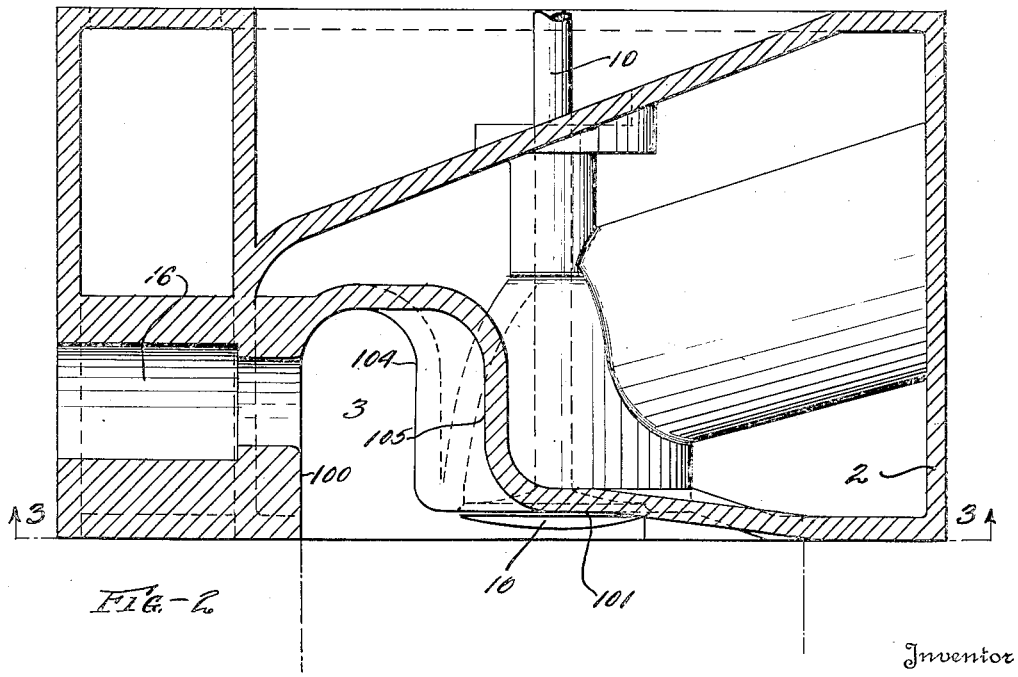

Further objects and advantages of my invention will be apparent from the following description taken in connection with the accompanying drawings, in which Fig. 1 is a transverse section through a cylinder of an engine of solid fuel injection type arranged to operate on a four stroke cycle, the section through the cylinder head portion thereof being taken in the plane of line 1—1, Fig. 3; Fig. 2 is an enlarged vertical section through the cylinder head removed, in the diametrical plane of line 2—2 of Fig. 3; Fig. 3 is a view looking upwards onto the cylinder head, removed; and Fig. 4 is a vertical section as in the plane of line 2, Fig. 3 showing details of the injection valve and operating mechanism therefor.

The engine is generally of standard and well known construction comprising a cylinder 1 the upper end of which is closed by a cylinder head 2 having a depression 3. A piston 4 is arranged for reciprocal movement in the bore of cylinder 1, having connection with a connecting rod 5 which in turn has a bearing upon a crank 6 of the usual crank shaft supported in the crank case 7. The head of the piston 4 thus forms with the cylinder head and the portion of the cylinder walls therebetween an expansion chamber.

The depression 3 is offset from the cylinder axis, the outer wall 100 of the depression being in continuation with the adjacent wall of the cylinder. That portion of the cylinder head overlying the cylinder and not comprising the combustion chamber portion being brought down to a face 101 lying generally in a plane transverse of the cylinder axis.

In the face 101 are a pair of ports 102 and 103 each of which is controlled by a poppet valve 10 actuable as by a cam 9 on a half time shaft 8 acting through roller tappet 13, push rod 12, rocker arm 11, against the action of a spring 15, all in well known manner. One of the valves 10 is timed to open its port during a suction stroke of the piston 4 to allow entrance of air to the expansion chamber. The other valve opens during the exhaust stroke of the piston allowing the products of combustion to pass out through the exhaust manifold 14.

The face 101 lies closely adjacent the head of the piston on upper dead center, the clearance allowed being preferably just sufficient to insure freedom from contact between the valves and piston during operation. The ports 102 and 103 are preferably centered on a diameter of the cylinder whereby the maximum port area is obtainable. The inner vertical walls 104 of the cylinder head extending from the face 101 upwards to form a confining surface of the depression 3 are curved as indicated in Fig. 3, forming between them a vertically extending valley 105.

Centrally of the wall 100, and opposite the valley 105 is an opening formed by step-bore 16 into which is fitted a chambered sleeve 17. This chambered sleeve forms one of the fittings for injection valve 24 arranged to supply fuel to the combustion chamber. The details of the valve and actuating mechanism therefor are immaterial here and it is sufficient to state that fuel is supplied to the valve through drill 22, lead 23, fitting 58, and supply line 62; and that the opening and closing movement of the valve are controlled by a cam shaft 46 acting through a lever 42 and forming no part of this invention. The valve 24 seats in a nozzle 19 having minute holes 20 through which fuel is forced under high pressure and at high velocity when the valve is lifted. It will be noted that the valve is arranged so that the discharge therefrom will be generally radial of the nozzle 19, and a reference to Fig. 2 will show that the distance from the nozzle to the opposite walls of the combustion chamber is approximately equal in all directions.

The result therefore is that upon opening of the injection valve, provided a proper adjustment of the fuel supply pressure has been made, fuel in highly vaporized state will be distributed from the nozzle toward the opposite walls, but will be consumed by combustion before actually reaching the walls. This result is highly important as already described above and is ideally accomplished by the arrangement herein shown.

As the piston 4 travels down on its suction stroke the air inlet valve 10 being open, the expansion chamber is filled with air, the air entering directly into the chamber through the inlet port and in the direction of piston movement. During the next succeeding or compression stroke all valves are closed and the air is compressed. As the piston approaches head end dead center position the space between the head of the piston and the face 101 of the cylinder head becomes flattened so that the air beneath the face 101 is forced rapidly laterally into the combustion chamber depression 3 generally tangentially thereof, so that a high degree of turbulence, clockwise Fig. 2, is set up in the combustion chamber, this being an ideal condition for combustion.

In the engine chosen for illustration, the fuel injection valve is opened about this time and combustion commences owing to the high compression and temperature conditions in the combustion chamber. Injection accompanied by combustion continues throughout a portion of the instant downward or expansion stroke of the piston, the injection period being governed by means forming no part of this invention.

In an engine arranged for operation on the Otto cycle, fuel mixture is fed in place of air through the inlet valve, and an ignition plug takes the place of the injection valve, the spark gap being in the location of the nozzle holes 20. Here turbulence results as before with other described advantages as will be understood by one familiar with the art.

What I claim is:

1. In an internal combustion engine, a cylinder, a head for said cylinder having a face transverse of the cylinder axis and a depression offset from said axis, said face and depression overlying the bore of said cylinder and said face having a pair of circular valve ports, the outer wall of said depression being of curvature corresponding with the adjacent portion of the cylinder wall and having a central opening adapted to receive injection valve means, and the opposite wall of said depression being of double convex curvature corresponding with the contours of said ports, with a valley lying opposite said opening, whereby the distance from said opening directly across said depression is substantially equal to the distances from said opening to the joinder of said outer wall with said opposite wall.

2. In an internal combustion engine, a cylinder, a head for said cylinder having a face transverse of the cylinder axis and a depression offset from said axis, said face and depression overlaying the bore of said cylinder and said face having a pair of circular valve ports centered on a diameter of said cylinder, the outer wall of said depression being of curvature corresponding with the adjacent portion of the cylinder wall and having a central opening, and the opposite wall of said depression being of double convex curvature corresponding with the contours of said ports, with a valley lying opposite said opening, an injection valve arranged in said opening and including a nozzle adapted to distribute fuel into said depression generally toward said valley, whereby said ports may have maximum area and the distance from said nozzle to said valley may be maximum.

In testimony whereof I hereby affix my signature.

ALEXANDER WINTON.